United States Patent Office 3,478,514
Patented Nov. 18, 1969

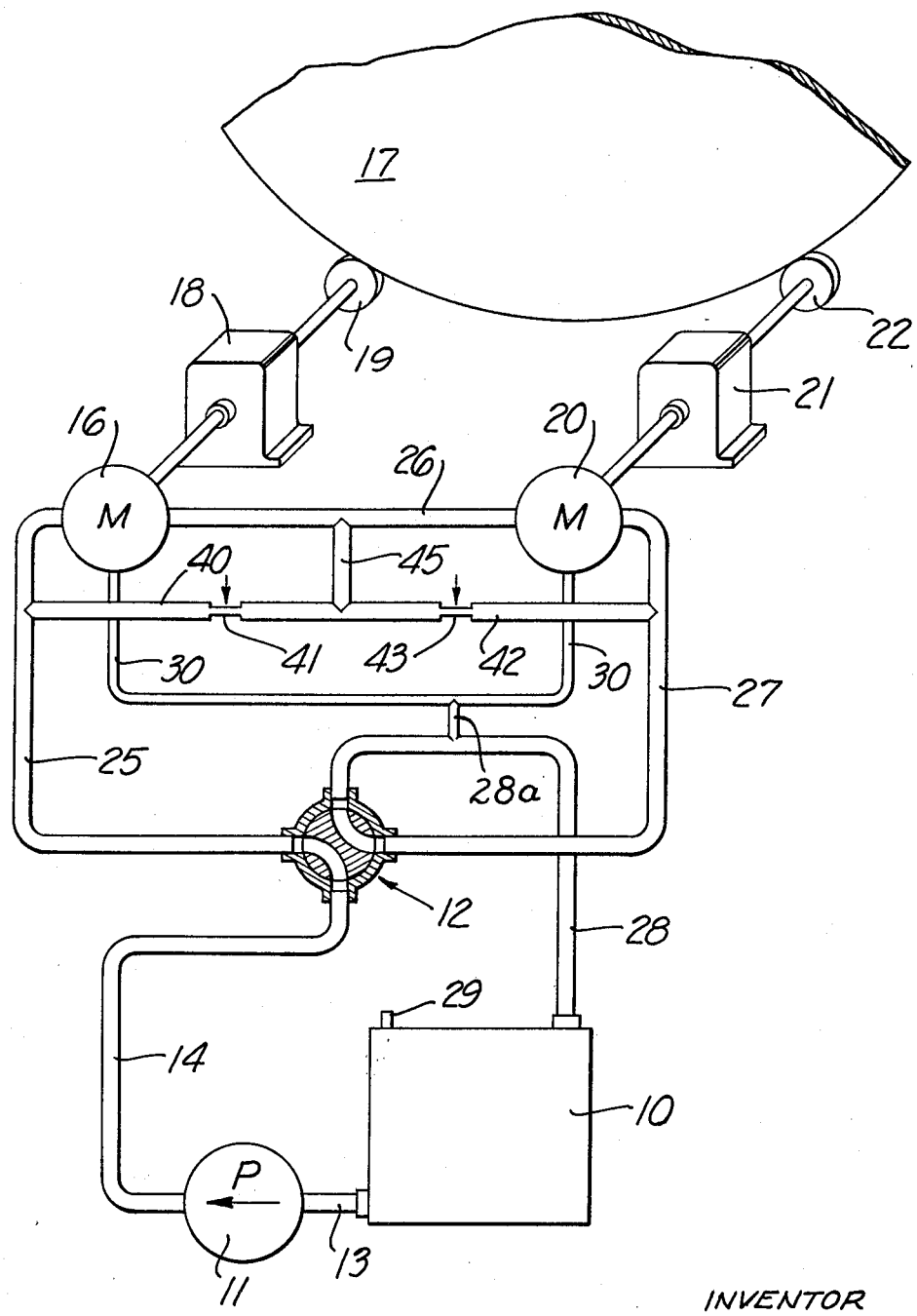

3,478,514
HYDRAULIC DRAIN MEANS FOR SERVO-SYSTEMS
Gary L. Parker, La Canada, Calif., assignor, by mesne assignments, to California Institute Research Foundation, Pasadena, Calif., a corporation of California
Filed Feb. 5, 1968, Ser. No. 703,107
Int. Cl. F01b 21/00; F01k 23/00
U.S. Cl. 60—53           5 Claims

ABSTRACT OF THE DISCLOSURE

A hydraulic servo drive for large loads providing improved response at very low speeds. A control system for providing substantial reduction in problems due to backlash and independent operation of motors. A pair of hydraulic drive motors connected in series with the fluid power source and an auxiliary system for compensating for drain line loss. An orifice connected across each motor to provide a source of fluid to the junction of the series connected motors.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to hydraulic servo drives utilizing a plurality of motors for driving large loads, such as cranes, gun mounts, telescopes, antennae, machine tool components, and the like.

The problems encountered in hydraulic drive systems for large loads are discussed in U.S. Patent No. 3,238,730, which also describes a number of prior art systems. Backlash in the mechanical drive components is a significant factor in performance limitation and it is an object of the present invention to provide a new and improved hydraulic servo drive which substantially eliminates backlash and provides accurate control for smaller angular movements and at lower operating speeds than has previously been possible.

Drives incorporating motors operated in parallel encounter problems of response lag at very low operating speeds and usually require matching of characteristics of components of the drive system. It is an object of the present invention to provide a series type system which substantially improves the dynamic range of the operating system and substantially eliminates cogging or independent operation of the two drive motors, and incorporating an additional fluid source at the interconnection of the two drive motors for compensating for drain line fluid loss of the drive motors.

The invention also comprises novel combinations and arrangements of parts which will more fully appear in the course of the following description. The figure of the drawing is a diagrammatic representation of a hydraulic servo drive incorporating a preferred embodiment of the present invention.

Referring to the system of the drawing, a hydraulic fluid is supplied from a reservoir or sump 10 by a pump 11 to a control valve 12 via lines 13, 14. A drive motor 16 is mechanically connected to a ring gear 17 of the load via a gear box 18 and pinion gear 19, which gears, for purposes of illustration, are shown as circular wheels. Another drive motor 20 is similarly connected to the ring gear 17 via a gear box 21 and pinion gear 22. The motors 16, 20 are connected in series with the control valve 12 by lines 25, 26, 27, with the line 26 serving as a junction interconnecting the motors. A fluid return line 28 connects the control valve 12 with the sump 10, with the sump ordinarily vented to the atmosphere by an open line 29. The motors 16, 20 are provided with case drain lines 30 which return fluid to the reservoir 10 by way of lines 28a and 28. The case drain lines function to prevent the internal motor fluid leakage from building up excessive pressures within the motor cases. A motor has two fluid loss components, which can be termed the input loss and the output loss.

A line 40 with an orifice 41 therein is connected across the motor 16 between the valve 12 and the line 26. A similar line 42 with an orifice 43 is connected across the motor 20 between the valve 12 and the line 26, with line 45 interconnecting lines 26, 40 and 42. The orifices 41, 43 may be conventional in design and may be made variable, so that they can be adjusted to provide optimum operation under particular conditions. Fixed orifices are preferred for operational stability and reliability. It is preferable to have the orifices set to provide substantially equal flow rates for the same pressure differentials thereacross, to achieve substantiallly symmetrical operation of the system in both directions. The internal dimensions of a typical orifice may be about .005 inch in diameter and about .125 inch long.

When the valve 12 is turned to the position in the drawing, both motors will start to rotate in the same direction and the differential pressures across the motors initially will be approximately equal. Initially the motors run at different rates due to fluid loss which has contributed to motion of motor 16 and which is not available to contribute to motion of motor 20. Pressure in the line 26 between the motors remains at about half the differential pressure across both motors. When the blacklash is all gone, the motors are constrained by the gear train to turn at the same rate. As the system continues to operate, the pressure in the line 26 will drop due to drain line loss so that the differential pressure across the motor 16 increases and the differential pressure across the motor 20 decreases. There will be a higher pressure across the orifice 41 than across the orifice 43 and, since the flow rate through an orifice is proportional to the differential pressure, more fluid flows through the orifice 41 than through the orifice 43. This results in a net fluid flow into the line 26 by way of line 45. The differential flow through the orifices compensates for all loss of fluid that has contributed to the motion of the upstream motor and which would not be available to contribute to movement of the downstream motor, i.e., the output loss from the upstream motor and the input loss from the downstream motor.

When the core of the control valve 12 is rotated 45° from the position shown in the drawing, the drive motors will be off, and when the core of the valve is rotated 90° from the position of the drawing, the motors will be driven in the opposite direction. Of course, intermediate driving speeds can be obtained in the usual manner by rotating the valve core to intermediate positions. For purposes of illustration valve 12 is shown as a rotary valve. It will be understood that other types of multiple port valves may be utilized, such as sliding spool valves. Preferably valve 12 is electrohydraulically actuated.

With the series hydraulic motor connection of the present invention, independent operation of the two motors is not possible, thereby eliminating one of the basic sources of trouble encountered with parallel motor configurations such as are described in U.S. Patent No. 3,238,730. The drive system of the present invention provides a smooth control of the load at very low rotational rates, while not adversely affecting performance at high rates. The series configuration is simpler than the parallel configuration of the prior art and does not require matching of characteristics of components, making replacement of parts much simpler.

With a series connection the pressure differential across each motor and the fluid flow for a given angular rate are one-half the value of a motor system connected in parallel. The resulting torque is likewise one-half that of a parallel connection. It is possible to compensate for these factors by merely changing cams to increase the motor displacement. When motor displacement is doubled, one can achieve torque and flow characteristics under the present invention, which are comparable to that of parallel connected systems, but without the attendant disadvantages.

The damping constant of the system is increased somewhat by the presence of the orifices 41, 43. However, this is an advantage in most applications since linearization of the nonconstant damping characteristics of the valve is effected. Since the low speed operation is improved without affecting the high speed operation, an increased dynamic range for the servo system is obtained.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:
1. In a reversible drive system for controlling movement of a load, the combination of:
   first and second hydraulically operated drive motors for operative engagement with the load;
   first fluid conduit means for connecting said motors in series with a fluid power source, with said motors interconnected at a junction;
   case drain lines connected to each of said motors; and
   second fluid conduit means connected across the series connected motors and connected to said junction for introducing fluid at said junction compensating for drain line fluid loss of the drive motors.

2. A drive system as defined in claim 1 in which said second fluid conduit means includes a first orifice connected across said first motor and a second orifice connected across said second motor.

3. A drive system as defined in claim 2 in which said first and second orifices provide substantially equal flow rates for the same pressure differentials.

4. A drive system as defined in claim 3 in which the flow rates of said orifices are adjustable.

5. A drive system as defined in claim 1 including a fluid power source comprising:
   a control valve,
   a pump connected to said control valve for supplying pressurized fluid,
   and a return line from said control valve, with said case drain lines connected to said valve return line,
   and in which said second fluid conduit means includes first and second orifices interconnected at said junction.

References Cited

UNITED STATES PATENTS

| | | | |
|---|---|---|---|
| 2,112,466 | 3/1938 | Maloon. | |
| 2,493,510 | 1/1950 | Tweedale | 60—53 XR |
| 2,493,512 | 1/1950 | Vickers | 60—53 XR |
| 3,057,161 | 10/1962 | Henke et al. | 60—53 |
| 3,166,952 | 1/1965 | Lang | 74—409 |
| 3,238,730 | 3/1966 | Webb | 60—97 |
| 3,348,624 | 10/1967 | Just et al. | 60—53 XR |
| 3,396,536 | 8/1968 | Miller et al. | 60—5.3 |

EDGAR W. GEOGHEGAN, Primary Examiner

U.S. Cl. X.R.

192—58